United States Patent [19]

Ogawa et al.

[11] Patent Number: 4,605,597
[45] Date of Patent: Aug. 12, 1986

[54] MAGNETIC RECORDING MEDIUM

[75] Inventors: Hiroshi Ogawa; Yasuo Tamai, both of Kanagawa, Japan

[73] Assignee: Fuji Photo Film Co.,Ltd., Kanagawa, Japan

[21] Appl. No.: 642,283

[22] Filed: Aug. 20, 1984

[30] Foreign Application Priority Data

Aug. 18, 1983 [JP] Japan ................................. 58-150512

[51] Int. Cl.$^4$ ................................................ G11B 5/70
[52] U.S. Cl. .................................... 428/522; 252/62.54;
360/134; 360/135; 360/136; 427/128; 428/694;
428/900
[58] Field of Search ............ 428/694, 695, 900, 425.9,
428/522, 480; 427/128; 252/62.54;
360/134-136

[56] References Cited

U.S. PATENT DOCUMENTS 4,400,435  8/1983  Yoda ..................................... 428/694
4,476,035  10/1984  Miyoshi .............................. 428/900

Primary Examiner—Ellis P. Robinson
Attorney, Agent, or Firm—Sughrue, Mion, Zinn, Macpeak & Seas

[57] ABSTRACT

A magnetic recording medium comprising a support having coated thereon a magnetic recording layer containing a ferromagnetic powder dispersed in a binder and a vinyl chloride-vinyl acetate copolymer having a degree of polymerization from about 10 to 100 and at least one terminal carboxyl group. The magnetic recording medium contains the above copolymer in an amount of from about 0.1 to 10 wt % based on the amount of ferromagnetic powder, and preferably also contains a conventional binder. This magnetic recording medium provides both video and audio magnetic tapes having superior running properties, durability and electromagnetic properties.

13 Claims, No Drawings

MAGNETIC RECORDING MEDIUM

FIELD OF THE INVENTION

The present invention relates to a magnetic recording medium, and more particularly it relates to a magnetic recording medium having superior electromagnetic properties and running durability.

BACKGROUND OF THE INVENTION

A magnetic recording medium, particularly when used for audio cassette tapes, is required to have a good frequency response and good reproduction of original sound because it is used for recording music. Recently such magnetic recording media have also required to have increased runability and durability for use in car stereo, cassette decks and cassette decks provided in radio sets.

A magnetic recording medium for video cassette tapes is used for higher density recording accomplished by shortening the recording wave length of narrowing the track width, and therefore, a magnetic recording medium having higher output, higher S/N ratio and better reproducing ability of original sound is required in this application. With the increase of the portable video tape recorder (VTR), magnetic recording tapes for VTR having much better running durability than conventional tapes are required, while the total thickness of such tapes is thinner, for example, not more than 20 μm.

Consequently, both audio tapes and video tapes currently produced are required to have superior electromagnetic properties, running properties and durability compared to conventional audio tapes and video tapes.

Various additives for magnetic layers have been proposed to provide these qualities, but the additives that are known have not completely satisfied the above requirements.

For example, surface active agent such as fatty acid salts, phosphates, alkyl sulfonates, sulfosuccinates or N-acylsarcosine are used as conventional dispersing agent for ferromagnetic powder as described in, for example, U.S. Pat. Nos. 3,460,984, 4,153,754, 4,285,825, 4,299,852 and 4,394,420.

However, where these conventional dispersing agents are used for preparing magnetic coating compositions having improved dispersibility of ferromagnetic powder, the magnetic layers obtained by coating and drying these magnetic coating compositions on a support often have poor runability at high temperature and high humidity and have poor running durability at normal temperature and humidity.

In addition, various coupling agents such as silane coupling agents or titanium coupling agents as described in, for example, U.S. Pat. Nos. 3,996,407, 4,076,890 and 4,415,630 have been proposed to improve the durability of a magnetic layer by increasing the wetting between the ferromagnetic powder and binder used. However, these coupling agents do not react sufficiently with ferromagnetic powders and deteriorate the dispersibility of ferromagnetic powder to reduce the electromagnetic properties of the resulting tape.

As described above, it is difficult to obtain both adequate elecctromagnetic properties and sufficient durability by using conventional additives for magnetic layers.

SUMMARY OF THE INVENTION

A first object of the present invention is to provide a novel magnetic recording medium having excellent electromagnetic properties.

A second object of the present invention is to provide a magnetic recording medium having excellent running properties and durability.

As a result of many researches and developments of additives for magnetic layers, the inventors have found that these and other objects of the present invention can be attained by a magnetic recording medium comprising a support having coated thereon a magnetic recording layer containing a ferromagnetic powder dispersed in a binder and a vinyl chloride-vinyl acetate copolymer having a degree of magnetic of from 10 to 100 and at least one terminal carboxyl group.

DETAILED DESCRIPTION OF THE INVENTION

The copolymer used in the present invention can be obtained by a conventional radical polymerization and ionic polymerization, using polymerization initiators shown in the following table.

| Chemical Structure | Structure | Abbreviation |
|---|---|---|
| 4,4'-Azo-bis(4-cyanopentanoic acid) | $(HO-\overset{O}{\underset{\|}{C}}-CH_2-CH_2-\overset{CH_3}{\underset{\underset{CN}{\|}}{C}}-N=)_2$ | (ABCPA) |
| Succinic Acid Peroxide | $(HO-\overset{O}{\underset{\|}{C}}-(CH_2)_2-\overset{O}{\underset{\|}{C}}-O-)_2$ | (SAP) |
| Glutaric Acid Peroxide | $(HO-\overset{O}{\underset{\|}{C}}-(CH_2)_3-\overset{O}{\underset{\|}{C}}-O-)_2$ | (GAP) |
| 2,2'-Azo-bis(4-carboxy-2-methyl butyronitrile) | $(HO-\overset{O}{\underset{\|}{C}}-CH_2-\overset{CH_3}{\underset{\underset{CN}{\|}}{C}}-N=)_2$ | (ABCMN) |

The degree of polymerization of the copolymer of the present invention should not be less than about 10 because adjustment of copolymerization ratio and polymerization degree is difficult, and should not be more than about 100 because dispersibility of ferromagnetic powder is not improved.

The degree of polymerization of the copolymer used in the present invention is preferably about 20 to 80. The distribution of molecular weight (MW/MN) of the copolymer is about 1 to 5, preferably about 1 to 3. In addition to vinyl chloride and vinyl acetate, as components of the copolymer, maleic anhydride and vinyl alcohol which is obtained by hydrolysis of vinyl acetate after a copolymerizing reaction can be included. The weight ratio of the components in the copolymer can be varied and preferably is about 60 to 95% of vinyl chloride, about 0.5 to 20% of finyl acetate, about 0 to 5% of maleic anhydride and about 0 to 15% of vinyl alcohol.
p In addition to the above components, a polymerization initiator and/or a chain transferring agent can be included therein.

The amount of the copolymer contained in the magnetic layer is about 0.1 to 10 wt %, preferably about 1 to 5 wt % based on the amount of ferromagnetic powder.

It is preferred that the copolymer of the present invention is used in combination with a conventional binder and if desired, conventional additives for a magnetic layer.

The conventional binder can be used in an amount of about 10 to 100 parts by weight per 100 parts by weight of the ferromagnetic powder and preferably 15 to 50 parts by weight per 100 parts by weight of the ferromagnetic powder. The amount of the conventional additives which can be used is about 0.1 to 20 parts by weight per 100 parts by weight of the ferromagnetic powder and 0.5 to 10 parts by weight per 100 parts by weight of ferromagnetic powder.

Typical examples of the conventional binder used in combination with the copolymer of the present invention includes vinyl chloride-vinyl acetate copolymers, vinylidene chloride copolymers, polyester resins, polyurethane resins, epoxy resins, polyisocyanates, etc. as described in, for example, U.S. Pat. Nos. 3,597,273, 3,840,400 and 4,429,017. The conventional binder provides superior dispersing effects where it is employed with the copolymer of the present invention.

The magnetic recording medium of the present invention can be prepared by dispersing a ferromagnetic powder, the copolymer, a binder and an additive in an organic solvent to provide a magnetic coating composition, and then coating it by any conventional method on a nonmagnetic support and drying.

The ferromagnetic powder is not unduly limited, and can be selected from conventional powders such as $\gamma$-Fe$_2$O$_3$, Co-modified iron dioxide, modified barium ferrite, modified strontium ferrite, and fine iron-alloy particles.

The particle size of ferromagnetic powder is not more than about 1 micron, preferably not more than about 0.5 micron, and the shape of the powder can be acicular, granular (e.g., rice-grained) or tabular.

The ferromagnetic powder, additives, organic solvents, and dispersing or coating methods are disclosed in Japanese Patent Application (OPI) Nos. 108804/77, 21805/79, 46011/79 (the term "OPI" as used herein refers to a "published, unexamined Japanese patent application") corresponding to U.S. Pat. Nos. 4,135,016, 4,186,228 and 4,201,809, respectively.

The present invention is explained in greater detail by reference to the following Examples, but the present invention should not be construed as being limited thereto. In the Examples all parts, ratios and percents are by weight unless otherwise indicated.

EXAMPLE 1

$\gamma$-Fe$_2$O$_3$ (Hc: 400 Oe, average particle length: 0.4 $\mu$m, axial ratio=1:15): 100 parts Vinyl Chloride/Vinyl Acetate/Vinyl Alcohol Copolymer (Weight ratio: 92:3:5, degree of polymerization: 400); 15 parts Polyester Polyurethane (molecular weight: about 50,000): 5 parts Copolymer having the composition shown in Table 1 and employed in the amount shown in Table 2):

Myristic Acid: 2 parts

Methyl Ethyl Ketone: 150 parts

Cyclohexanone: 50 parts

The above components were kneaded for 3 hours using a batch-type sand grinder to prepare a dispersion which was then filtered through a filter having an average pore size of 3 microns to obtain a magnetic coating composition. The thus-obtained coating composition was coated on a polyethylene terephthalate film having a thickness of 7 microns to produce a magnetic coating layer having a dry thickness of 5 microns, and this magnetic coating was subjected before drying to magnetic orientation using an electromagnetic field of 1,000 gauss, and then was dried. After drying, the magnetic layer was subjected to super-calender treatment to smooth the surface thereof to an average center line roughness (Ra) of 0.04 $\mu$m at a cut off value of 0.25 mm. The magnetic recording medium thus obtained was slit to provide audio magnetic tapes having a width of 3.81 mm useful for a Phillips type compact cassette.

The characteristics of the audio magnetic tapes are shown in Table 2 (Samples Nos. 1 to 6).

COMPARATIVE EXAMPLE 1

The same procedure as in Example 1 was repeated except that a low molecular weight copolymer having no terminal carboxyl group (Table 1, G to J) or a low molecular weight copolymer having a terminal carboxyl group (Table 1, K) but having a degree of polymerization of about 150 was used instead of the copolymer shown in Example 1 to obtain audio cassette tapes.

The characteristics of the audio cassette tapes are shown in Table 2 (Sample Nos. C-1 to C-6).

EXAMPLE 2

Co-coated Berthollide Iron Oxide (Co: 3.0 atomic %, FeO$_x$: x=1.4, Hc: 680 Oe, average particle length: 0.3 $\mu$m, axial ratio=1.15)); 100 parts Vinyl Chloride/Vinyl Acetate/Maleic Anhydride Copolymer (Weight ratio: 86:13:1, degree of polymerization: 400): 10 parts Polyester Polyurethane (molecular weight: about 50,000): 10 parts Copolymer having the composition shown in Table 1 and employed in the amount shown in Table 3)

Myristic Acid: 1 part

Butyl Stearate: 1 part $\alpha$-Alumina (average particle Size: 0.5$\mu$): 5 parts Electroconductive Carbon (average particle size: 10 $\mu$m): 3 parts The above components were kneaded for 3 hours using a batch-type sand grinder, and 6.7 parts of "Desmodur L-75" manufactured by Sumitomo Bayer Co., Ltd. was added to the mixture and then dispersed for 10 minutes. Thus obtained dispersion was filtered through a filter having an age pore size of 1 micron to provide a magnetic coating composition.

The coating composition was coated on a polyethylene terephthalate film having a thickness of 14 microns to obtain a dry thickness was 5 microns, and was subjected to magnetic orientation treatment using an electromagnetic of 2,000 gauss before the layer was dried. After drying, the coating layer was super-calendered to smooth the surface of the coating layer to an average centerline roughness (Ra) of 0.01 $\mu$m at a cut off value of 0.25 mm, and the resulting magnetic recording medium was slit to obtain video recording tapes having a width of ½ inch (VHS type).

The characteristics of the video tapes are shown in Table 3 (Sample Nos. 7 to 12).

COMPARATIVE EXAMPLE 2

The same procedure as in Example 1 was repeated except that sodium oleate, alkyl (C$_{12}$–C$_{18}$) phosphate (trade name "Gafakku Re 610" manufactured by Toho Kasei Co., Ltd.) and sodium sulfosuccinate was employed instead of the oligomer in Example 2 to obtain video recording tapes.

The characteristics of the video tapes are shown in Table 3 (Sample Nos. C-7 to C-10).

EXAMPLE 3

The same procedure as in Example 2 was repeated except that a Fe-Ni alloy fine powder (Fe:Ni=9 5:5, Hc: 1300 Oe, acicular ratio: 10:1 and average particle length: 0.3 micron) was employed instead of the Co-coated Berthollide iron oxide in Example 2 to provide video tapes.

The characteristics of the video tapes are shown in Table 4 (Sample Nos. 13 to 16).

COMPARATIVE EXAMPLE 3

The same procedure as in Comparative Example 2 was repeated except that the Fe-Ni alloy fine powder in Example 3 was employed instead of the Co-coated Berthollide iron oxide in Comparative Example 2 to provide video tapes.

The characteristics of the video tapes are shown in Table 4 (Sample Nos. C-11 to C-14).

TABLE 1

| Designation for Copolymers | Copolymers used in Examples and Comparative Examples | | | | | |
|---|---|---|---|---|---|---|
| | Components of Copolymer | | | | Degree of Polymerization | Terminals COOH Group |
| | Vinyl Chloride % | Vinyl Acetate % | Vinyl Alcohol % | Maleic Anhydride % | | |
| A | 87 | 13 | — | — | 35 | present |
| B | 87 | 13 | — | — | 70 | present |
| C | 91 | 3 | 5 | — | 40 | present |
| D | 91 | 3 | 5 | — | 80 | present |
| E | 86 | 13 | — | 1 | 25 | present |
| F | 86 | 13 | — | 1 | 50 | present |
| G | 87 | 13 | — | — | 70 | absent |
| H | 91 | 3 | 5 | — | 80 | absent |
| I | 86 | 13 | — | 1 | 50 | absent |
| J | 91 | 3 | 5 | — | 150 | absent |
| K | 91 | 3 | 5 | — | 150 | present |

TABLE 2

| Sample No. | Copolymers Designation | Amount (parts) | Squareness Ratio (Br/Bm) | Surface Gloss (%) | MOL (dB) | SOL (dB) | Audio Runability | Head Staining | Tape Squeal |
|---|---|---|---|---|---|---|---|---|---|
| Example 1 | | | | | | | | | |
| 1 | A | 3 | 0.90 | 179 | 1.5 | 2.3 | A | A | A |
| 2 | B | 3 | 0.90 | 177 | 1.3 | 2.0 | A | A | A |
| 3 | C | 3 | 0.92 | 180 | 2.2 | 2.7 | A | A | A |
| 4 | D | 3 | 0.91 | 178 | 2.0 | 2.5 | A | A | A |
| 5 | E | 3 | 0.92 | 186 | 2.4 | 3.1 | A | A | A |
| 6 | F | 3 | 0.90 | 183 | 2.3 | 2.9 | A | A | A |
| Comparative Example 1 | | | | | | | | | |
| C-1 | — | — | 0.87 | 154 | 0.0 | 0.0 | B | B | A |
| C-2 | G | 3 | 0.89 | 168 | 0.7 | 0.6 | A | B | A |
| C-3 | H | 3 | 0.88 | 164 | 0.5 | 0.5 | A | B | A |
| C-4 | I | 3 | 0.89 | 170 | 0.8 | 1.2 | A | B | A |
| C-5 | J | 3 | 0.87 | 168 | 0.2 | 0.2 | B | B | A |
| C-6 | K | 3 | 0.88 | 160 | 0.3 | 0.4 | B | B | A | video tapes.

TABLE 3

| Sample No. | Copolymers Designation | Amount (parts) | Surface Gloss (%) | Video Output (dB) | S/N Ratio (dB) | Still Life (min.) | Video Runability | Dropout | Tape Squeal |
|---|---|---|---|---|---|---|---|---|---|
| Example 2 | | | | | | | | | |
| 7 | A | 3 | 180 | 1.8 | 2.0 | 120 or more | A | A | A |
| 8 | C | 3 | 184 | 2.1 | 2.3 | 120 or more | A | A | A |
| 9 | E | 3 | 191 | 2.4 | 2.5 | 120 or more | A | A | A |
| 10 | F | 3 | 188 | 2.1 | 2.1 | 120 or more | A | A | A |
| 11 | E | 1 | 184 | 1.9 | 2.0 | 120 or more | A | A | A |
| 12 | E | 5 | 196 | 2.6 | 2.5 | 110 | A | A | A |
| Comparative Example 2 | | | | | | | | | |
| C-7 | — | — | 167 | 0.0 | 0.0 | 90 | A | A | A |
| C-8 | (1) | 3 | 174 | 0.8 | 0.9 | 100 | A | B | C |
| C-9 | (2) | 3 | 171 | 0.7 | 0.9 | 110 | B | B | B |
| C-10 | (3) | 3 | 175 | 0.9 | 1.2 | 120 | B | C | C |

(1): Sodium Oleate,
(2): Alkyl Phosphate (trade name "Gafakku Re 610" manufactured by Toho Kasei Co., Ltd.),
(3): Sodium Sulfosuccinate

TABLE 4

| Sample No. | Copolymers Designation | Amount (parts) | Surface Gloss (%) | Video Output (dB) | S/N Ratio (dB) | Still Life (min.) | Video Runability | Dropout | Tape Squeal |
|---|---|---|---|---|---|---|---|---|---|
| Example 3 | | | | | | | | | |
| 13 | A | 3 | 243 | 2.1 | 1.8 | 60 | A | A | A |
| 14 | C | 3 | 256 | 2.6 | 2.3 | 70 | A | A | A |
| 15 | E | 3 | 264 | 2.8 | 2.5 | 80 | A | A | A |
| 16 | F | 3 | 265 | 2.8 | 2.4 | 80 | A | A | A |
| Comparative Example 3 | | | | | | | | | |
| C-11 | — | — | 201 | 0.0 | 0.0 | 30 | A | B | A |
| C-12 | (1) | 3 | 210 | 0.6 | 0.9 | 40 | B | C | D |
| C-13 | (2) | 3 | 216 | 0.8 | 0.6 | 40 | B | C | C |
| C-14 | (3) | 3 | 213 | 0.7 | 0.5 | 50 | B | C | D |

(1): Sodium Oleate,
(2): Alkyl Phosphate (trade name "Gafakku Re 610" manufactured by Toho Kasei Co., Ltd.),
(3): Sodium Sulfosuccinate The tape characteristics indicated in Tables 2 to 4 were evaluated by the following methods:

(a) Squareness Ratio

The ratio of the residual flux density (Br) to the maximum flux density (Bm) was measured using a "Model VSM 3" manufactured by Toei Kogyo Co., Ltd. in an external magnetic field of 1 K Oe (kilo-oersted or 80 KA/m).

(b) Surface Gloss

The percent total reflection was measured in the machine direction with a standard glass meter ("Model GK 45D" manufactured by Suga Testing Machine Co., Ltd.) at an angle of incidence of 45 degrees and an angle of reflection of 45 degrees.

(c) MOL

The maximum output level (distortion ratio of 3%) at 315 Hz was measured with a cassette tape deck ("Model 582" manufactured by Nakamichi Co., Ltd.) using Sample No. C-1 as a reference tape that was a maximum output level of 0 db.

(d) SOL

The saturation output level at 10 KHz was measured with the above "Model 582" cassette tape deck using Sample No. C-1 as a reference tape that was assigned a saturation output level of 0 db.

(e) Audio Runability

Tape running tests were conducted with 100 commercial tape cassette decks at 25° C. and 50% RH and 40° C. and 80% RH to see how uniformly the tape samples could be wound and the sum of numbers of cassette decks used under both the conditions and showing irregularity in tape winding was recorded for each tape sample. The results were evaluated on the following four grade basis.

A . . . could be wound uniformly on all decks
B . . . could not be wound uniformly on 1 to 5 decks
pl C . . . could not be wound uniformly on 5 to 10 decks
D . . . could not be wound uniformly on 11 or more decks (f) Head Staining After evaluation of the tape runability, the head of each deck was checked for the presence of stain and the results were evaluated on the following three-grade basis.

A . . . stain was absent or hardly detectable
B . . . some but negligible stain
C . . . considerable stain (g) Tape Squeal The presence of any tape squeal was also checked during the tape running tests, and the results were evaluated on the following four-grade basis.

A . . . no tape squeals were heard
B . . . occasional squeals were heard on 1 to 2 cassette tapes
C . . . occasional squeals were heard on 3 to 5 cassette tapes
D . . . occasional squeals were heard on 6 or more cassette tapes, and frequent squeals were heard on 1 to 2 cassette tapes (h) Video Output The output at 4 MHz was measured using an "NV-6600" VHS manufactured by Matsushita Electric Industrial Co., Ltd. using Sample No. C-7 in Table 3 and Sample No. C-11 in Table 4 as reference tape that were assigned an output of 0 dB.

(i) S/N Ratio

The S/N ratio at 10 KHz to 4 MHz after visibility correction was measured with an "NV-6600" VHS manufactured by Matsushita Electric Industrial Co., Ltd.

(j) Still Life

The time (min.) for a serious defect to occur in a picture reproduced in a still mode was measured using an "NV-6600" VHS manufactured by Matsushita Electric Industrial Co., Ltd.

(k) Video Runability

Video runability tests were conducted with 50 commercial VHS video tape decks at 125° C. and 50% RH and 40° C. and 80% RH to see if any jitter or skew occurred, and the results were evaluated on the following three-grade basis.

A . . . no jitter or skew
B . . . some but insignificant jittering or skewing
C . . . frequent jittering or skewing caused a problem (l) Dropout (D. O.)

The number of dropouts in each tape sample was measured simultaneously while the video runability was being measured, and was compared with the initial value of dropouts. The results were evaluated on the following four-grade basis.

A . . . increase of D.O. was less than 10 per min.
B . . . increase of D.O. was less than 20 per min.
C . . . increase of D.O. was less than 30 per mn.
D . . . increase of D.O. was not less than 30 per min.

It is apparent from Table 2 that Sample Nos. 1 to 6 (audio cassette tapes using the copolymer of the present invention) havwe a better squareness ratio, better surface glass and for this reason more excellent dispersibility of ferromagnetic powders than Sample No. C-1 without the copolymer and Sample Nos. C-2 to C-4 using a copolymer without terminal carboxyl group. Furthermore, Sample Nos. 1 to 6 have better audio runability, head staining, tape squeal and running durability than Sample Nos. C-1 to C-4.

Sample Nos. C-5 and C-6 using the copolymer having a high degree of polymerization provide less improvement in squareness ratio, surface gloss, MOL, SOL and runnability than the Samples using the copolymer according to the invention having a lower polymerization degree.

It is apparent from Table 3 that Sample Nos. 7 to 12 video tapes using the copolymer of the present invention) have higher surface gloss and better dispersibility of ferromagnetic powder than Sample No. C-7 without the copolymer and Sample Nos. C-8 to C-10 using a conventional dispersing agent. Furthermore, Samples Nos. 7 to 12 have higher video output and S/N ratio, and better video runability and durability (i.e., still life or dropouts) than Sample Nos. C-7 to C-10.

Sample nos. C-8 to C-10 using a conventional dispersing agent have higher video output and S/N ratio than Sample No. C-7 using no copolymer, but have sufficient still life and dropout characteristics.

Similar conclusions can be drawn from both Table 4 and Table 3, i.e., that the magnetic recording medium of the present invention has better electromagnetic properties, runability and durability because the copolymer used in the present invention provide better dispersibility of the ferromagnetic powder in both audio cassette and video cassette applications.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a support having coated thereon a magnetic layer containing a ferromagnetic powder dispersed in a binder and a copolymer of vinyl chloride and vinyl acetate having at least one terminal carboxyl group and a degree of magnetic of from about 20 to 80 and wherein the amount of said copolymer is about 0.1 to 10 wt % based on the amount of the ferromagnetic powder.

2. The magnetic recording medium as claimed in claim 1, wherein a distribution of molecular weight (MW/MN) of said copolymer is from about 1 to 5.

3. The magnetic recording medium as claimed in claim 1, wherein said copolymer contains vinyl alcohol.

4. The magnetic recording medium as claimed in claim 1, wherein said copolymer contains maleic anhydride.

5. The magnetic recording medium as claimed in claim 2, wherein the distribution of molecular weight (MW/MN) of said copolymer is from about 1 to 3.

6. The magnetic recording medium as claimed in claim 1, wherein said copolymer contains vinyl alcohol and maleic anhydride.

7. The magnetic recording medium as claimed in claim 6, wherein said copolymer contains from about 60 to 95% vinyl chloride, from about 0.5 to 20% of vinyl acetate, from about 0 to 5% of maleic anhydride, and from 0 to 15% vinyl alcohol.

8. The magnetic recording medium as claimed in claim 1, wherein the amount of said copolymer is from about 1 to 5 wt % based on the amount of the ferromagnetic powder.

9. the magnetic recording medium as claimed in claim 1, wherein said binder is selected from the group consisting of vinyl chloride-vinyl acetate copolymers, vinylidene chloride copolymers, polyester resins, polyurethane resins, epoxy resins and polyisocyanates.

10. The magnetic recording medium as claimed in claim 9, wherein said vinyl chloride-vinyl acetate copolymers are selected from the group consisting of a vinyl chloride-vinyl acetate copolymer, a vinyl chloride-vinyl acetate-vinyl alcohol copolymer and a vinyl chloride-vinyl acetate-maleic anhydride copolymer.

11. The magnetic recording medium as claimed in claim 1, wherein said binder is selected from the group consisting of vinyl chloride-vinyl acetate copolymers.

12. The magnetic recording medium as claimed in claim 11 wherein said vinyl chloride-vinyl acetate polymers are selected from the group consisting of a vinyl chloride-vinyl acetate copolymer, a vinyl chloride-vinyl acetate-vinyl alcohol copolymer and a vinyl chloride-vinyl acetate-maleic anhydride copolymer.

13. The magnetic recording medium as claimed in claim 1, wherein said copolymer is synthesized by use of a polymerization initiator containing carboxyl group.

* * * * *

UNITED STATES PATENT AND TRADEMARK OFFICE
CERTIFICATE OF CORRECTION

PATENT NO. : 4,605,597

DATED : August 12, 1986

INVENTOR(S) : Hiroshi Ogawa et al

It is certified that error appears in the above-identified patent and that said Letters Patent is hereby corrected as shown below:

Claim 1, lines 5-6, delete "magnetic" and substitute therefor --polymerization--.

Signed and Sealed this

Sixteenth Day of December, 1986

Attest:

DONALD J. QUIGG

Attesting Officer

Commissioner of Patents and Trademarks